Patented Apr. 23, 1935

1,999,158

UNITED STATES PATENT OFFICE 1,999,158

GYPSUM PLASTER AND PROCESS OF MAKING THE SAME

Carlisle K. Roos, Wheaton, Ill., assignor to United States Gypsum Company, Chicago, Ill., a corporation of Illinois No Drawing. Application October 13, 1932, Serial No. 637,673

11 Claims. (Cl. 106—34)

The present invention relates to a stabilized plastic-working calcined gypsum wall plaster and the process for its manufacture, the main object being the production of a stronger and more stable product.

One of the objects of the invention is to treat pre-aged calcined gypsum which ordinarily has a comparatively low consistency, so as to increase its consistency as well as its plasticity; while at the same time rendering the product thus produced more stable as to its setting time than similar products of the prior art.

A further object of the invention is to treat pre-aged calcined gypsum by mechanical means, such for example as grinding, so as to increase the plasticity thereof and to render its setting time less subject to change upon storage.

A further object of the invention is to grind pre-aged calcined gypsum, either retarded or unretarded, to a degree of fineness sufficient substantially to increase its plasticity and consistency while at the same time producing a product whose setting time does not change materially upon lapse of time.

Further objects of the invention will become apparent from the detailed description hereinbelow and from the claims hereunto appended.

In order that a better understanding of the present invention may be had, the properties of the prior art products upon which this invention is a great improvement will be briefly considered. For example, ordinary ground calcined gypsum or plaster of Paris such as is used as a base for the production of gypsum wall plasters, consists of a more or less heterogeneous mixture of different phases including predominantly calcium sulphate hemihydrate and anhydrous calcium sulphate of the variety known as soluble anhydrite. Such a commercial calcined product, in order to constitute a usable wall plaster is usually furnished to the trade in admixture with small quantities of filamentous material, such as hair or equivalent fiber, these added materials being employed in amounts of from 4 to 10 lbs. per ton of plaster. In order to render such commercial plasters slow setting, from 0.25% to 0.5% of organic colloidal materials are added, the most common being some form of glue or similar animal product. It is a characteristic of ordinary commercial gypsum wall plaster to absorb some moisture during storage, this resulting in the hydration of the therein contained soluble anhydrite, thereby converting the same into the hemihydrate. The total effect of this water absorption is to render the plaster much slower setting and also to make the same somewhat undesirable for reasons which will be mentioned hereinbelow. The ordinary commercial gypsum wall plaster, when freshly manufactured, is found to have a setting time of about five hours, particularly when it is employed in admixture with sand in the ratio of two parts of sand to one part of the gypsum plaster, both by weight. Such a mixture, however, is not stable, but after aging for a short time, for example four weeks, will have a setting time of eight hours, and after a further storage of two months will be found to require as much as twelve hours or longer to set. After two months have elapsed, the rate of increase in setting time is slower, for by that time most of the soluble anhydrite will have been converted into hemihydrate so that the commercial gypsum plaster then will set in from sixteen to twenty hours. Further storage, however, has the opposite effect; that is to say, during the second year sufficient moisture will have been absorbed by the hemihydrate to produce a few minute seed crystals of calcium sulphate dihydrate which, because of their catalytic effect, render the product quick setting. Eventually the product will be so greatly accelerated in setting-time by the presence of these crystals that it will set as fast as from five to ten minutes after being mixed with the gaging water.

Obviously such changes are extremely undesirable, as the properties of the commercial product will be dependent upon its age and it will therefore require a preliminary test before the user can be assured of how it will act when applied to the wall. A further undesirable result of the formation of hemihydrate from the soluble anhydrite and the formation of the aforesaid seed crystals is the concomitant lowering of the water:plaster ratio for standard working consistency. Simultaneously with the lowering of the consistency there occurs a loss of plasticity and the ability of the plaster to produce a sufficiently plastic mortar when mixed with the usual three or four parts of sand, such as is used in common wall plastering operations.

These changes in the setting time and loss of plasticity are largely the result of the instability of the combination of mixed phases present in ordinary calcined gypsum. The reason for this is that the effect of retarders is different upon the setting time of the soluble anhydrite than it is upon that of calcium sulphate hemihydrate. For example, soluble anhydrite requires about 50% more retarder than does the hemihydrate to produce a product having the same setting time. Therefore a freshly made calcined gypsum wall plaster properly retarded by means of commercial retarders will be satisfactory when first made, but later on as the soluble anhydrite disappears, the product will be greatly over-retarded. Furthermore, the soluble anhydrite requires more water to produce standard consistency than does the hemihydrate and consequently as the soluble anhydrite disappears the amount of gaging water required to bring about a gaged product of standard consistency is decreased. Now inasmuch as the amount of retarder in the plaster remains constant but less water is added the resultant solution of the retarder in the water is more concentrated and hence the retarding effect is enhanced, thereby causing the product to have a longer setting time than is desirable.

The aging effects found in the prior art commercially retarded gypsum wall plasters are further complicated by the fact that some crystal and particle accretion occurs during these changes in phase, thereby further lowering the amount of gaging water required to bring the plaster to standard consistency. For instance, ordinary calcined gypsum of average purity when freshly manufactured will require from 75 to 85 parts of water per 100 parts of the plaster by weight to produce a mix of standard consistency. After such a product has stood for six weeks, however, under ordinary storage conditions, it will be found that it requires only 65 parts of water. Three weeks later its consistency will be as low as 60, and will then during the ensuing six months drop to as low as 56, remaining practically stationary thereafter.

The above defects are overcome by the practice of the present invention. It has now been discovered by the inventor that calcined gypsum which is composed largely of hemihydrate, and particularly such a product as is produced by artificial or pre-aging methods during calcination, may be retarded with commercial or organic retarder with the result that the plaster so made remains relatively stable over a period of months. However, such a type of calcined gypsum has heretofore been used exclusively for such purposes where quick setting is essential, namely for ornamental molding and for industrial casting purposes. When so used the product is moderately fine ground and employed without the addition of retarders. However, such types of plaster are not ordinarily used, nor are they suitable for plastering purposes, used either alone or in admixture of the same, for the reason that they lack the necessary plasticity and do not work well when mixed with the usual quantity of sand such as is employed for plastering purposes. As a result the yardage covered per ton of material is much lower than is the case with ordinary commercial gypsum wall plaster.

A pre-aged calcined gypsum plaster such, for example, as that described in the United States Patent No. 1,370,581, has a sand carrying capacity of about two and one-half to three parts by weight of plaster. In accordance with the present invention, however, such a type of plaster can be made to work plastic and satisfactorily with as much as four parts of sand by weight, by the expedient of grinding the same superfine, as for example in an open circuit tube mill with a feeding ratio of about 1 to 8 of the grinding media, by weight. In such grinding it has been found unnecessary to take any special precaution to restrain the liberation of moisture or to cause it to recombine with the ground product, as is for example described in United States Patent No. 1,392,574. Therefore, in practicing the invention the gypsum is calcined so as to leave therein the theoretical proportion of moisture required to constitute calcium sulphate hemihydrate or slightly more but not to exceed 0.5% above the theoretical requirement as based upon the calcium sulphate content of the product; that is to say, the product initially should contain from 6.2% to 6.7% of water. By allowing this amount of moisture to remain, the production of any appreciable quantity of soluble anhydrite is avoided. The effect, furthermore, can be explained by the fact that the plaster as fed to the tube mill contains relatively little of the soluble anhydrite and therefore, since the hemihydrate predominates as the more stable of the two phases, it will serve to repress the tendency to form soluble anhydrite.

In the practice of the present invention a pre-aged low consistency calcined gypsum plaster such as is described in Brookby Patent No. 1,370,581 is employed. The product of said patent contains a small amount of a deliquescent salt of an alkaline earth metal, such for example as calcium chloride. Alternatively, a gypsum plaster that has been artificially aged by means of steam or water vapor, or by other means, may be employed. The fineness of such pre-aged gypsum plaster is of such a degree that ordinarily from 75 to 95% by weight of the product will pass through a standard 100 mesh screen. Such a plaster contains little or no soluble anhydrite and requires to bring it to standard consistency from 50 to 60 parts by weight of water to 100 parts by weight of plaster. Also, if such a product is ground as fine as ordinary plaster it lacks the required plasticity. By subjecting such a plaster, however, to a superfine milling process as hereinbelow described, it will be rendered plastic and capable of carrying upwards of four parts by weight of sand.

The amount of continuous grinding necessary will vary with the different plasters employed. For instance, some of the purer plasters are quite soft and hence require much less work for reduction than do the denser and less pure variety. For example, if pre-aged plaster of average purity, such as is secured from various deposits occurring in the United States, is ground to a point where the standard consistency of the plaster as measured before the superfine grinding is increased by at least 10 parts per 100 parts of plaster by weight it will be found to have acquired sufficient plasticity and sand-carrying capacity to come within the scope of the present invention. In carrying out the process, therefore, such a pre-aged plaster is ground sufficiently to increase its consistency by from 15 to 20 parts, but not to exceed 25 parts above its original consistency. Preferably a pre-aged calcined gypsum whose standard consistency prior to grinding is 56 is ground for a sufficient length of time so that after leaving the mill it will require 76 parts of water to 100 parts by weight of plaster. This ground product is then mixed with the usual amount of fiber and a sufficient quantity of a commercial organic retarder to give it the desired setting time.

The following comparison of the relative stability of prior art commercial retarded gypsum plaster and that produced by the process of the present invention will serve to show the remarkable difference in stability obtained. For example, comparing calcined gypsum wall plaster produced from Webster County, Iowa, gypsum as to its stability of setting time with the ordinary gypsum wall plaster manufactured from the same source and retarded to produce the same initial fresh setting time, the test being made with two parts of standard testing sand to one part of the respective plasters, the results would be as follows:

| Age | Setting time | |
|---|---|---|
| | Ordinary plaster | Stabilized plaster |
| One day | Five hours | Five hours. |
| One month | Eight hours | Six hours. |
| Two months | Twelve hours | Eight hours. |
| Six months | Eighteen hours | Twelve hours. |
| Twelve months | Twenty hours | Twelve hours. |

The improved plasticity obtained is termed mechanical plasticity, that is to say, while a large percentage of the particles are reduced to ten micron diameter or smaller, they are still stable hemihydrate and as they have not been dehydrated by the grinding operation, they approach a semi-colloidal condition merely by subdivision.

Calcined gypsum wall plaster manufactured by the process of the present invention will carry from four to five parts of sand by weight without the necessity of using the excessively high additions of gauging water required ordinarily for freshly manufactured wall plasters with high soluble anhydrite content. As a result, one of the advantages of the new process is the production of a stronger and better plastered wall. Another advantage of the plaster produced by the present process is that its sand-carrying capacity after one year is nearly equal to that when freshly made, whereas most other plasters usually lose 50% in sand-carrying capacity within that time. The amount of water required for standard consistency drops twenty to twenty-five parts per hundred parts of wall plaster by weight for ordinary plasters in one year, whereas wall plaster made by the present process is lowered only from five to ten parts per hundred. A further and most important result obtained by the process is the improvement in the stability of the setting time.

To sum up the process, therefore, it comprises grinding pre-aged low consistency commercial calcined gypsum plaster so as to raise its consistency as well as its plasticity and to stabilize the setting time so that it will remain substantially constant after having reached its maximum.

There are no mechanical limitations on the present invention further than that the grinding is preferably carried out in a tube mill. The time of grinding must be determined for each particular type of plaster and this can readily be accomplished by taking a sample thereof and testing it for consistency and comparing the consistency thus found with that of the product prior to the grinding operation. The present invention has been found to be extremely useful for it enables the commercial production of gypsum plasters whose characteristics are definitely fixed so that they may be used with the utmost assurance of constant results and without the necessity of experimentation with each new lot of the product purchased.

I would state in conclusion that while the described example constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. A calcined gypsum wall plaster made from artificially aged calcined gypsum carrying a small amount of water-soluble deliquescent substance intimately incorporated therewith, being substantially free from soluble anhydrite, and having a testing consistency ranging between sixty-five and seventy-five parts of water per one hundred parts of neat plaster by weight.

2. A set-stabilized retarded calcined gypsum wall plaster made from a low-consistency calcined gypsum carrying a small amount of water-soluble deliquescent substance intimately incorporated therewith, rendered plastic by regrinding.

3. The process of producing a relatively stable plastic gypsum wall plaster which comprises regrinding calcined gypsum, carrying a small amount of water-soluble deliquescent substance intimately incorporated therewith, sufficiently to raise the water required for testing consistency ten to twenty parts per one hundred parts of plaster by weight above the amount of water required per hundred parts of plaster before regrinding.

4. The process of stabilizing the setting-time of low-consistency gypsum wall plaster containing a small amount of a deliquescent substance incorporated therewith which comprises regrinding said plaster under such conditions as to avoid the production of soluble anhydrite from the calcined gypsum therein contained.

5. The process of producing plastic gypsum wall plaster that is stabilized as to its setting-time which comprises regrinding calcined gypsum, containing incorporated therewith a small amount of a water-soluble deliquescent substance, without appreciably changing its moisture content, for a sufficient length of time so as to increase the water required for bringing the reground product to testing consistency ten to twenty parts per hundred parts of plaster, by weight, above its original water-requirements.

6. A retarded calcined gypsum wall plaster made from preaged calcined gypsum carrying a small amount of water-soluble deliquescent substance intimately incorporated therewith, rendered plastic by regrinding.

7. A retarded calcined gypsum wall plaster made from preaged calcined gypsum carrying a small amount of water-soluble deliquescent substance intimately incorporated therewith, rendered plastic by tube-mill grinding.

8. A retarded calcined gypsum wall plaster artificially aged by incorporation therewith of a deliquescent water-soluble substance, made plastic by regrinding.

9. A retarded calcined gypsum wall plaster stable as to its setting time and consisting of gypsum plaster artificially aged by incorporation therewith during its manufacture of a small amount of a deliquescent salt of an alkaline-earth metal, made plastic by regrinding.

10. A highly plastic calcium sulphate hemihydrate plaster having a setting time, plasticity, and sand-carrying capacity, none of which properties is materially affected by length of time of storage, consisting of retarded gypsum plaster containing a small amount of calcium chloride, and reground so as to be rendered plastic and to have a testing consistency of from ten to twenty parts greater than that of a similarly constituted plaster that has not been reground.

11. The process of stabilizing the setting-time and plasticity of a calcium sulfate hemihydrate plaster against changes due to lapse of time, which comprises incorporating with calcium sulphate hemihydrate a small amount of a deliquescent water-soluble substance and regrinding the mixture for a length of time sufficient to increase its testing consistency ten to twenty parts above the normal testing consistency of the said calcium sulfate hemihydrate.

CARLISLE K. ROOS.